United States Patent
Fortunati et al.

(10) Patent No.: US 12,114,276 B2
(45) Date of Patent: Oct. 8, 2024

(54) DEVICE AND METHOD FOR MONITORING TWO TIME BASES OF TWO COMMUNICATION DEVICES WITH THE AID OF A COMPUTER

(71) Applicant: Siemens Mobility GmbH, Munich (DE)

(72) Inventors: Daniel Fortunati, Hannover (DE); Bhabani Nayak, Munich (DE); Ernesto de Stefano, Braunschweig (DE)

(73) Assignee: Siemens Mobility GmbH, Munich (DE)

( * ) Notice: Subject to any disclaimer, the term of this patent is extended or adjusted under 35 U.S.C. 154(b) by 0 days.

(21) Appl. No.: 18/571,352

(22) PCT Filed: May 30, 2022

(86) PCT No.: PCT/EP2022/064575
§ 371 (c)(1),
(2) Date: Dec. 18, 2023

(87) PCT Pub. No.: WO2022/263152
PCT Pub. Date: Dec. 22, 2022

(65) Prior Publication Data
US 2024/0267857 A1      Aug. 8, 2024

(30) Foreign Application Priority Data
Jun. 18, 2021  (EP) ..................................... 21180390

(51) Int. Cl.
*H04W 56/00* (2009.01)
*G06F 9/30* (2018.01)
(Continued)

(52) U.S. Cl.
CPC ...... *H04W 56/001* (2013.01); *G06F 9/30043* (2013.01); *H04J 3/0658* (2013.01);
(Continued)

(58) Field of Classification Search
CPC ...... H04J 3/0658; H04J 3/0667; H04J 3/0647; H04W 56/001; H04N 21/4341;
(Continued)

(56) References Cited

U.S. PATENT DOCUMENTS

2008/0168294 A1* 7/2008 Batson ............... H04N 21/4341
                                                      713/400
2017/0346588 A1* 11/2017 Prins .................... H04W 56/001
(Continued)

FOREIGN PATENT DOCUMENTS

DE    102005005287 A1    8/2006
DE    102018208210 A1    11/2019

OTHER PUBLICATIONS

Christian, Flaviu, "Probabilistic clock synchronization", Distributed Computing, Spinger-Verlag, Published: Sep. 1989, vol. 3, pp. 146-158, DOI https://doi.org/10.1007/BF01784024—Published in English.

*Primary Examiner* — Kyung H Shin
(74) *Attorney, Agent, or Firm* — Laurence A. Greenberg; Werner H. Stemer; Ralph E. Locher (57) ABSTRACT

A computer-assisted method for monitoring a first time base of a first communication device and a second time base of a second communication device. First, Cristian's algorithm is used to calculate time offset intervals between the time bases. Second, the maximally possible drift of the time offset is ascertained multiple times for two measurement steps. A minimally possible drift is ascertained from the upper limit of the time offset interval for the previous measurement step and the lower limit of the time offset interval for the
(Continued)

subsequent measurement step. The upper and lower limits of a drift interval are calculated from the maximally and minimally possible drifts. Third, the lowest upper limit is defined as the upper limit of a resulting drift interval, and the highest lower limit is defined as the lower limit of the resulting drift interval with narrow limits for the relative drift.

15 Claims, 4 Drawing Sheets

(51) Int. Cl.
    *H04J 3/06*         (2006.01)
    *H04L 43/0852*     (2022.01)
    *H04L 43/16*       (2022.01)
    *H04N 21/434*     (2011.01)

(52) U.S. Cl.
    CPC .......... *H04L 43/0858* (2013.01); *H04L 43/16* (2013.01); *H04N 21/4341* (2013.01)

(58) Field of Classification Search
    CPC .. H04N 21/8547; H04N 21/2368; G06F 1/12; G06F 9/30043; G06Q 20/00; G06Q 40/04
    See application file for complete search history.

(56) References Cited

U.S. PATENT DOCUMENTS

2018/0047100 A1*   2/2018   Bonig ................. G06F 9/30043
2022/0123849 A1*   4/2022   McCall ................. H04J 3/0658

\* cited by examiner

DEVICE AND METHOD FOR MONITORING TWO TIME BASES OF TWO COMMUNICATION DEVICES WITH THE AID OF A COMPUTER

FIELD AND BACKGROUND OF THE INVENTION

The invention relates to a method for computer-assisted monitoring of a first time basis of a first communications facility and of a second time basis of a second communications facility. In addition, the invention relates to a system with a first communications facility, having a first time basis with a second communications facility, having a second time basis and with an interface for establishing a communications link between the first communications facility and the second communications facility. Finally the invention relates to a computer program product and to a provisioning apparatus for this computer program product, with the computer program product being equipped with program commands for carrying out this method.

As is known, a time delay can occur between a first time basis of a first communications facility and a second time basis of a second communications facility.

A fundamental method for synchronization of time bases is known, for example, from the document "Probabilistic clock synchronization" (Flaviu, Cristian, Distributed Computing (1989) 3:146-158). The method described there shall be referred to below as Cristian's algorithm and can be substantially described by the method steps disclosed in the introduction in a first sequence of the method, wherein in each measuring step respectively, at first instant, which is based on the first time basis, a first message is sent by the first communications facility to the second communications facility, at a second instant, which is based on the second time basis, the first message is received by the second communications facility, at a third instant, which is based on the second time basis, a second message is sent from the second communications facility to the first communications facility, and at a fourth instant, which is based on the first time basis, the second message is received by the first communications facility, a time delay interval, in which a time delay between the first time basis and the second time basis can lie, is determined from the first instant, the second instant, the third instant and the fourth instant.

A method which uses Cristian's algorithm to estimate a time delay between two time bases is described in WO 2019/223951 A1. With the aid of Cristian's algorithm a plurality of time delay intervals is determined, wherein with the aid of an extrapolation of successive time delay intervals and by taking into account an assumed drift of the time delay, it is possible to form auxiliary windows for a possible time delay. By forming an intersection with regard to a plurality of auxiliary windows, a resulting time delay interval can be ascertained, which, compared to the time delay intervals of the preceding measurements, has a smaller error.

This is achieved in that in a second sequence of the method, for an earlier measuring step and a later measuring step, a maximum possible drift in the time between the earlier measuring step and the later measuring step is ascertained multiple times by taking into account the lower limit of the time delay interval for the earlier measuring step and the upper limit of the time delay interval for the later measuring step, a minimum possible drift in the time between the earlier measuring step and the later measuring step is ascertained multiple times by taking into account the upper limit of the time delay interval for the earlier measuring step and the lower limit of the time delay interval for the later measuring step, an upper limit is calculated multiple times by taking into account the maximum possible drift and a lower limit of a drift interval, in which a relative drift describing the change over time in the time delay can lie, is calculated multiple times by taking into account the minimum possible drift.

SUMMARY OF THE INVENTION

The invention is based on the object of disclosing a method for computer-assisted monitoring of a first time basis of a first communications facility and of a second time basis of a second communications facility, with which a time delay between the time bases or a drift of the time delay can be determined as accurately as possible in the shortest time possible in order to monitor the two communications facilities by using the result. In addition, the object of the invention is to disclose a computer program product and a provisioning apparatus for the computer program product with which said method can be carried out.

This object is inventively achieved with the subject matter of the claim (method) disclosed in the introduction in that in a third sequence, of a plurality of drift intervals, the lowest upper limit is set as the upper limit of a resulting drift interval for the relative drift and the highest lower limit is set as the lower limit of the resulting drift interval for the relative drift.

The first sequence, second sequence and third sequence of the inventive method should be taken to mean sequences of method steps respectively, which are carried out in a computer-assisted manner to achieve the determination results or calculation results described in more detail below. The results of the first sequence are needed in the second sequence and the results of the second sequence are needed in the third sequence. However, this does not mean that the sequences have to be carried out one after the other. They can also be carried out in parallel if each sequence is repeated separately, with the results of a previously concluded first sequence then being used for the second sequence currently being carried out and the results of a previously concluded second sequence being used for the third sequence currently being carried out.

The first sequence is an implementation of Cristian's algorithm described in the introduction. After determining said four instants, the time delay interval $\Delta(n)$, which specifies the interval for a possible time delay, within which the time delay, i.e. the absolute time difference between the first time basis and the second time basis, can only lie at all on the basis of the measured instants, is determined according to Cristian's algorithm.

With Cristian's algorithm, the procedure is such that the time delay $\Delta(n)$ is calculated from the first instant, the second instant, the third instant and the fourth instant. A maximum possible error for the time delay (s) can be calculated from the first instant, the second instant, the third instant and the fourth instant, and by taking into account the maximum possible error, an upper limit and a lower limit of the time delay interval can be calculated (more on this below).

The first sequence contains at least three measuring steps. This can be substantiated in that the first sequence has to form a basis for the implementation of the second sequence. This has to consider two measuring steps in each case multiple times, namely an earlier measuring step n and a later measuring step n+x. In this case, n specifies the number of the measuring step and is a natural number. A later measuring step has an interval x from the earlier measuring step, with this also being a natural number here. For an adjacent later measuring step, x=1 would thus apply. If a minimum of three measuring steps are therefore carried out in the first sequence, then a maximum of three comparisons can be carried out in the second sequence: namely the comparison of the measuring steps 1 and 2, the measuring steps 2 and 3 and the measuring steps 1 and 3. The possible combinations increase when n>3.

If the time delay intervals from an earlier measuring step and a later measuring step are known, the time delay interval of the two measurements that results hereby can be used to ascertain a maximum possible change in the time delay (also called drift) and a minimum possible change in the time delay by taking into account the measurement uncertainty determined by the time delay interval. A maximum possible drift results when the time delay in the earlier measuring step is assumed to be minimal and the time delay in the later measuring step is assumed to be maximal within the respective time delay interval. For this reason, the lower limit of the time delay interval is taken into account for the earlier measuring step and the upper limit of the time delay interval for the later measuring step. Conversely, a minimum possible drift results when the time delay in the earlier measuring step is assumed to be maximal and the time delay in the later measuring step is assumed to be minimal. For this reason, the upper limit of the time delay interval of the earlier measuring step and the upper limit of the time delay interval of the later measuring step is taken into account in this case.

Unlike in the prior art, however, the drift ascertained from two measuring steps is not used to ascertain an auxiliary window by extrapolation. Instead, a plurality of, preferably at least three, drift intervals is/are determined in the manner disclosed above and combining herefrom a resulting drift interval may be ascertained, which may advantageously be localized much more accurately and, in addition, by way of measurements (measuring steps) already enables comparatively reliable statements about the drift that is present in a comparatively short period, since non-systematic errors, such as transmission-induced runtime differences of the first message and the second message are optimally eliminated. This is achieved, in particular, if in the second sequence, every time delay interval ascertained in the first sequence is combined with every other time delay interval ascertained in the first sequence in order to ascertain an associated drift interval.

A comparatively accurate result can be ascertained with the inventive method therefore for the drift in a comparatively short period. Or a comparatively accurate relative time delay between the first time basis and the second time basis can be calculated from the drift by taking into account the period. This advantageously also enables operation of safety-relevant communications facilities whose synchronous communication is a prerequisite for the relevant method, with COTS (commercial off the shelf) components as the time basis. Communications engineering in the rail system can be cited as an example of an application which has to satisfy a high safety standard.

In the third ramp, of the plurality of ascertained intervals of the second sequence, inventively the lowest upper limit is set as the upper limit of the resulting drift interval and the highest lower limit is set as the lower limit of the resulting drift interval for the drift. Behind this is the important finding for the invention that each of the individual drift intervals was ascertained with the same reliability with regard to the occurrence of errors. But since the prerequisites of the individual measurements can contain errors of different magnitude, which depend on the respectively applicable conditions of transmission, the errors of different magnitude and unknown errors can be localized by taking into account the lowest upper limit and the highest lower limit respectively of the available intervals for the resulting interval.

The aim of the method can be, for example, monitoring a synchronization of the two time bases. This involves the determination of a relative time delay between the first time basis and the second time basis. Monitoring can also occur by determining the drift. If it is found during monitoring that the synchronization can no longer be carried out owing to an increasing time delay or a progressive drift, appropriate countermeasures have to be initiated (more on this below). The countermeasures can consist, for example, of an error message or also of a correction, that is to say, reduction of the time delay.

In connection with the invention, "computer-assisted" or "computer-implemented" can be taken to mean an implementation of the method in which at least one computer carries out at least one method step of the method.

The term "computer" covers all electronic devices with data processing properties. Computers can be, for example, personal computers, servers, handheld computers, cell phones and other communications devices, processors and other electronic devices for data processing, which can preferably also be joined together to form a network.

In connection with the invention, a "processor" can be taken to mean, for example, a converter, a sensor for generating measuring signals, or an electronic circuit. A processor can be, in particular, a Central Processing Unit (CPU), a microprocessor, a microcontroller, or a digital signal processor, possibly in combination with a storage unit for storing program commands, etc. A processor can also be taken to mean a virtualized processor or a soft CPU.

In connection with the invention, a "storage unit" can be taken to mean, for example, a computer-readable memory in the form of a Random-Access Memory (RAM) or data memory (hard disk or data carrier).

"Interfaces" can be implemented in terms of hardware, for example, in a wired manner or as a radio link, or in terms of software, for example as an interaction between individual program modules of one or more computer program (s).

"Program modules" should be taken to mean individual operation sequences, which enable an inventive program sequence of computer-assisted method steps. These operation sequences can be accomplished in a single computer program or in a plurality of computer programs which communicate with one another. The interfaces achieved here can be implemented in terms of software inside a single processor or in terms of hardware if a plurality of processors is used.

Unless stated otherwise in the following description, the terms "create", "establish", "determine", "calculate", "generate", "configure", "modify" and the like preferably refer to processes which generate or change data or convert the data into other data. The data is, in particular, in the form of physical variables, for example electrical pulses or also measured values. The required instructions are combined as software as program commands in a computer program. Furthermore, the terms "send", "receive", "read-in", "read-out", "transmit", "transfer" and the like refer to the interaction of individual hardware components and/or software components via interfaces.

According to one embodiment of the invention, it is provided that the time delay is calculated during a measuring step n on the basis of the sending time of the first message as the time difference between the first instant and the second instant and the sending time of the second message as the time difference between the third instant and the fourth instant.

In particular, the difference between the two said time differences can be used to assess a potential time delay between the two time bases. Behind this is the consideration that a time delay results in a shift of the measured times compared to the real times. The measured sending time of the one message is shorter and the other message longer thereby, with the messages being the first message and the second message in the first sequence of the method. In this regard, the time delay has twice the effect on the measured sending times.

It can be provided, for example, that the time delay $\Delta(n)$ during a measuring step n is calculated according to the formula:

$$\Delta(n)=((T2(n)-T1(n))-(T4(n)-T3(n)))/2 \quad (1)$$

That the result (in the denominator) is divided by two takes into consideration the fact that, as already mentioned, the time delay has twice the effect on the measured sending times. It is not necessary, however, to divide the result by two if this is taken into account in the further course of the method (more on this below).

According to one embodiment of the invention, it is provided that a maximum possible error for the time delay is calculated during a measuring step n by taking into account a message runtime measured in the first communications facility as the time difference between the first instant and the fourth instant and a reaction time measured in the second communications facility as the time difference between the second instant and the third instant.

The measured message runtime is not the actual message runtime. This can be substantiated by the fact that the measurement is afflicted by measuring errors. The greatest measuring error lies in the fact that a time difference between the first instant and the fourth instant is not taken into account, that there is a reaction time in the second communications facility from receiving the first message through to sending the second message.

The last-mentioned measuring error may be easily ascertained, however. It consists in the measured reaction time, which can be calculated as the time difference between the second instant and the third instant and for this reason reduces the measured message runtime by the measured reaction time. If the measured reaction time is therefore deducted from the measured message runtime, the result will represent a better approximation of the actual message runtime.

At the same time, the result forms a measure of the maximum possible error, if the consideration that the signal runtimes can vary owing to irregularities in the transmission path is taken as a basis. These variations are large compared to the measuring accuracy when ascertaining the relevant instants to be measured. For this reason, a measuring error owing to variations in the transmission, which are determined by taking into account the reaction time of the second communications facility, can be sufficiently accurately estimated.

It can be provided, for example, that the maximum possible error (s) of the relevant measuring step n is calculated according to the formula:

$$e(n)=((T4(n)-T1(n))-(T3(n)-T2(n)))/2 \quad (2)$$

The time difference between the fourth instant and the first instant specifies the measured signal runtime. The reaction time of the second communications facility, ascertained by the time difference between the third instant and the second instant, can be deducted from this runtime. Since two transmissions are involved, the result (denominator) can be divided by two to obtain the maximum possible error per transmission.

Alternatively, dividing by two can be omitted if it is taken into account in the calculation in the further course of the method. The maximum possible error can thus also be calculated solely with the above-mentioned denominator.

In other words, it is possible to establish that the actual time delay $\delta(n)$ of a measuring step n reliably lies in the following interval.

$$\Delta u(n)=\Delta(n)-e(n)\leq\delta(n)\leq\Delta(n)+e(n)=\Delta o(n) \quad (3)$$

where $\Delta u(n)$ is the lower limit of the time delay interval of the measuring step, $\Delta o(n)$ is the upper limit of the time delay interval of the measuring step.

If formulae (1) and (2) are inserted in formula (3), then the upper limit and the lower limit of the time delay interval are obtained for the actual time delay $\delta(n)$:

$$\Delta u(n)=T3(n)-T4(n)\leq\delta(n)\leq T2(n)-T1(n)=\Delta o(n) \quad (4)$$

According to one embodiment of the invention, it is provided that the lower limit of the time delay interval $\Delta u(n)$ of the measuring step n is calculated according to the formula:

$$\Delta u(n)=T3(n)-T4(n)$$

and the upper limit of the time delay interval 40 (n) of the measuring step (n) is calculated according to the formula:

$$\Delta o(n)=T2(n)-T1(n).$$

As already explained above, the measurements for the time delay $\Delta(n)$ as well as the estimation of the error e(n) are taken into account in these formulae, which represent parts of formula (4).

According to one embodiment of the invention, it is provided that a time difference between the earlier measuring step and the later measuring step n+x is calculated, with the measured first instants or the measured second instants or the measured third instants or the measured fourth instants of the earlier measuring step and of the later measuring step being taken into account for ascertaining the time difference.

The time difference specifies a measure for the period which lies between the earlier measuring step and the later measuring step. This time difference is necessary for ascertaining the drift on the basis of the ascertained time delays since the drift is defined as the change over time in the time delay. In this case, it is advantageous to use instants which are available anyway within the framework of ascertaining the measuring results of the measuring steps.

Comparable instants are used respectively, i.e. for example the fourth instant of the earlier measuring step and the fourth instant of the later measuring step (the same applies to the first, second and third instants).

Insertion

According to one embodiment of the invention, it is provided that the upper limit Ωo(n, n+x) of the drift interval is calculated according to the formula:

$$\Omega o(n,n+x)=(\Delta o(n+x)-\Delta u(n))/(T4(n+x)-T4(n))$$

and the lower limit Δu(n, n+x) of the drift interval is calculated according to the formula:

$$\Omega u(n,n+x)=(\Delta u(n+x)-\Delta o(n))/(T4(n+x)-T4(n))$$

where n is the earlier measuring step, n+1 is the later measuring step,

Δu(n) is the lower limit of the time delay interval of the earlier measuring step, Δu(n+x) is the lower limit of the time delay interval of the later measuring step, Δo(n) is the upper limit of the time delay interval of the earlier measuring step, Δo(n+x) is the upper limit of the time delay interval of the later measuring step, T4 (n) is the fourth instant of the earlier measuring step, T4 (n+x) is the fourth instant of the later measuring step.

The expression (T4 (n+x)−T4(n)) provides a time difference between the earlier measuring step (n) and the later measuring step (n+x), it also being possible to alternatively use the measured first instants, the measured second instants or the measured third instants of the earlier measuring step and of the later measuring step, as already described above, for ascertaining the time difference.

The above-mentioned calculation formulae advantageously specify an algorithm with which the intervals can be calculated in a computer-assisted manner from an earlier measuring step and a later measuring step respectively, while observing short arithmetic operators.

According to one embodiment of the invention, it is provided that a resulting drift value Ωr is determined as the mean of the upper limit of the resulting drift interval and the lower limit of the resulting drift interval.

Determination of the resulting value in this manner is based on the consideration that defining the drift value as the mean in the resulting interval means that an error connected with the definition can amount to half of the interval width at most. A risk that a greater error exists for the resulting drift value is minimized in this way.

According to one embodiment of the invention, it is provided that a critical drift value Ωc is defined and it is checked whether the critical drift value is in the resulting drift interval and/or the resulting drift value Ωr overshoots the critical drift value.

By defining a critical drift value, it is possible to decide for an application, which is dependent on communication via the two communications facilities, how long it can be safely operated. In particular, a synchronization of the units carrying out the application can be necessary for the safe operation of the application in order for process steps of the application to be enabled with a synchronized exchange of data via the first 8 communications facilities and the second communications facility. Jeopardizing a smooth synchronization over a minimum required period can be jeopardized on reaching or overshooting the critical drift value, so further measures can be derived (for example, a correction of the time bases in order to reduce the time delay).

According to one embodiment of the invention, it is provided that for the second sequence, a time interval is defined in which all earlier measuring steps and later measuring steps to be considered have to lie.

An evaluation can take place after expiry of the time intervals respectively by carrying out the third sequence. When determining the length of the time interval it is possible to take into account the fact that the following conditions are met for carrying out the second sequence.

The time interval must be sufficiently long for it to be possible to carry out the required number of measuring steps. In addition, it should be taken into account that the time interval must be sufficiently long for it to be possible to metrologically establish a drift of the time delay at all.

On the other hand, it should be taken into account that a change in the external conditions, in particular the temperature, can cause an increase or reduction in the drift, which, however, should not be considered for the assessment. Variations in temperature generate, as it were, a reversible increase or reduction in the time delay, which, within permissible limits, therefore does not have to be and should not be reacted to. If the time interval is not too large and the drift interval is not too small, then the actual drift always lies in the drift interval despite variations.

On the other hand, a drift owing to a change in temperature may not be metrologically differentiated from a drift owing to the accuracy of the first time basis and the second time basis. Therefore, the time interval should be short enough for a change in temperature to have only a slight effect on the determinations of the time delay, carried out in the measuring steps within the time interval, in relation to the anticipated accuracy of the first time basis and the second time basis.

It can realistically be assumed, for example, that the metrologically ascertained resulting interval has an interval size (range) of 20 ppm. Furthermore, it is realistic that a possible time delay is shifted by one ppm per Kelvin change in temperature. This value typically applies to COTS oscillators (that is to say, Commercial-off-the-Shelf components) with the active principle of an oscillating crystal. If an environment is now assumed in which a change in temperature can be a maximum of 1 K/min, a drift in the time delay within a time interval for measuring of 1 minute is smaller by a factor of 20 than the range of the resulting interval. As a result, it is thereby highly probable that the actual drift lies within the resulting drift interval. It is thus advantageous to define the length for the time interval of the second sequence as 1 minute at most, preferably 30 seconds at most and even more preferably 10 seconds at most.

According to one embodiment of the invention, it is provided that the time basis of the one communications facility is defined as a reference and the time basis of the other communications facility is modified by taking into account the resulting drift by the first communications facility and the second communications facility.

If the time basis of the one communications facility is defined as a reference, a reduction in the time delay can be achieved, if required, by a measure in the case of the time basis of the other communications facility. This ensures that the first time basis and the second time basis permanently run synchronously within the admissible deviations, whereby synchronized communication between the first communications facility and the second communications facility is advantageously ensured.

The following measures, which are known per se, can be carried out to align the first time basis and the second time basis. The time basis, which is not used as a reference, can be slowed down or sped up as required to reduce a time delay in relation to the time basis which is used as a reference. Another possibility consists in rapidly correcting the time measurement (what is known as stepping).

It is also possible for more than two time bases to be kept synchronous by the method. In this case, of the time bases to be synchronized, one time basis is used as the reference time basis and the inventive method, in particular said step of modification, is carried out with each of the other time bases respectively.

Said object is alternatively also inventively achieved with the subject matter of the claim (system) disclosed in the introduction in that the system is configured to carry out a method for computer-assisted monitoring as claimed in one of the preceding claims.

A system within the meaning of the invention should be taken to mean a technical system in which an exchange of data is necessary between different communications facilities of the system. This is the case, in particular, if the system has a plurality of computers, which have to be operated in such a way that a synchronized exchange of data via the first communications facility and the second communications facility is necessary.

According to one embodiment of the invention, it is provided that the interface for establishing the communications link is provided by a Cloud.

In this case, the system can be composed of individual technical components whose communications link is guaranteed as a service, for example by a Cloud provider. The transmission times can vary with communication via a Cloud, so the inventive method can be used particularly advantageously to optimally attenuate these variations by way of the formation of the resulting drift interval the effects of these variations.

A "Cloud" should be taken to mean an environment for "Cloud computing". What is meant is an IT infrastructure, which is made available via interfaces of a network such as the Internet. As a rule, it includes storage space, processing power or software as a service, without these having to be installed on the local computer using the Cloud. The services offered within the framework of Cloud computing comprise the entire spectrum of information technology and includes, inter alia, infrastructure, platforms and software.

According to one embodiment of the invention, it is provided that the system is a rail system.

As already mentioned, rail systems in particular, such as interlockings, benefit from the application of the inventive method since a reliable synchronization of communicating components of the rail system must be ensured.

The advantages, which have already been explained in connection with the method described in more detail above, may be achieved with the system. That which was stated in relation to the inventive method also applies accordingly to the inventive system.

Furthermore, a computer program product with program commands for carrying out said inventive method and/or its exemplary embodiments is claimed, wherein the inventive method and/or its exemplary embodiments respectively can be carried out by means of the computer program product.

Furthermore, ae provisioning apparatus for storing and/or providing the computer program product is claimed. The provisioning apparatus is, for example, a storage unit, which stores and/or provides the computer program product.

Alternatively and/or in addition, the provisioning apparatus is, for example, a network service, a computer system, a server system, in particular, a distributed, for example cloud-based, computer system and/or virtual computer system, which stores and/or provides the computer program product preferably in the form of a data stream.

The computer program product is provided in the form of a program data block as a data file, in particular, as a downloadable file, or as a data stream, in particular as a downloadable data stream, of the computer program product.

This can also be provided, for example, as a partial download, however, which is composed of a plurality of parts. A computer program product of this kind is read into a system, for example, by using the provisioning apparatus, so the inventive method is executed on a computer.

Further details of the invention will be described below on the basis of the drawing. Identical or corresponding elements of the drawing are provided with identical reference characters respectively and will only be explained multiple times insofar as differences emerge between the individual figures.

The exemplary embodiments explained below are preferred embodiments of the invention. In the exemplary embodiments, the described components of the embodiments represent individual features of the invention, which are to be considered independently of each other respectively, which develop the invention, also independently of each other respectively, and should therewith also be regarded individually or in a combination other than that shown as a constituent part of the invention. Furthermore, the described components can also be combined with the above-described features of the invention.

DETAILED DESCRIPTION OF THE INVENTION

Figure 1:
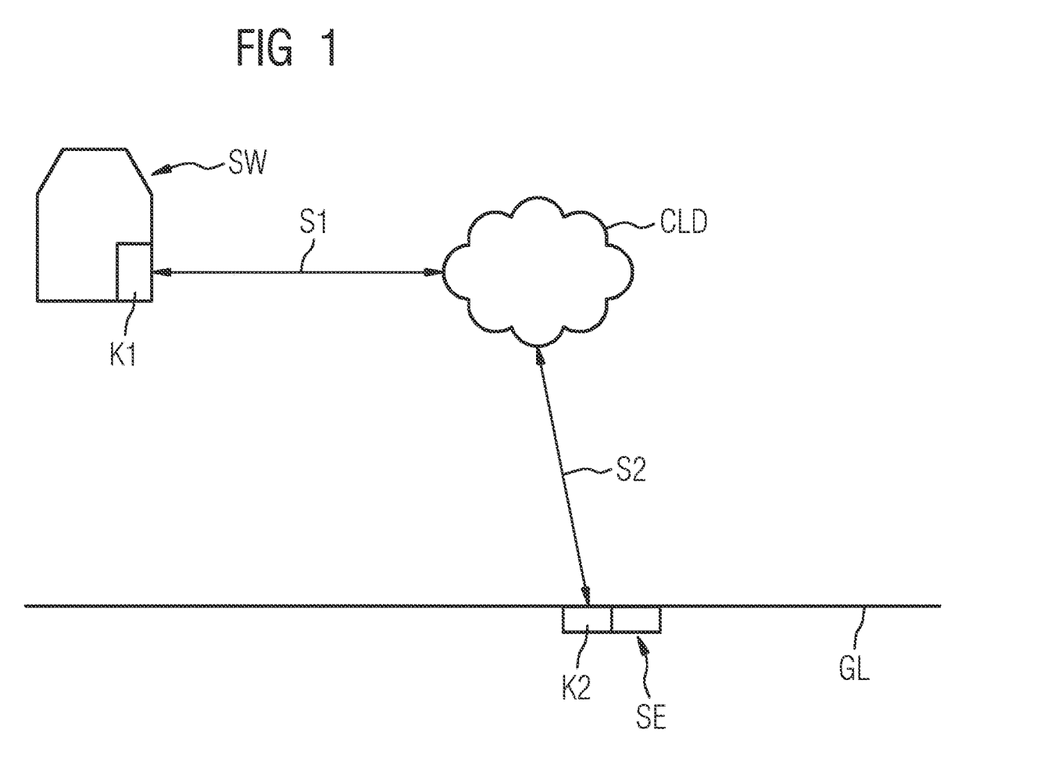
FIG. 1 schematically shows an exemplary embodiment of the inventive system with its cause-effect relationships.

FIG. 1 schematically shows a system in a rail environment in which an exemplary embodiment of the inventive method can run. A rail GL is represented in which a trackside facility SE is fitted. This provides a second communications facility K2 which is connected to a Cloud CLD via a second interface S2. Another component is provided by an interlocking SW. This has a first communications facility K1 which is likewise connected to the Cloud CLD via a first interface S1.

The first communications facility K1 and the second communications facility K2 can thus communicate with one another via the Cloud CLD using the first interface S1 and the second interface S2. It is also possible that direct communication is guaranteed between the first communications facility K1 and the second communications facility K2 in a wired manner or via a radio interface (not shown). The rail components, which communicate with one another, can also be guaranteed by way of rail components of the interlocking SW other than those represented and the trackside facility SE.

Figure 2:
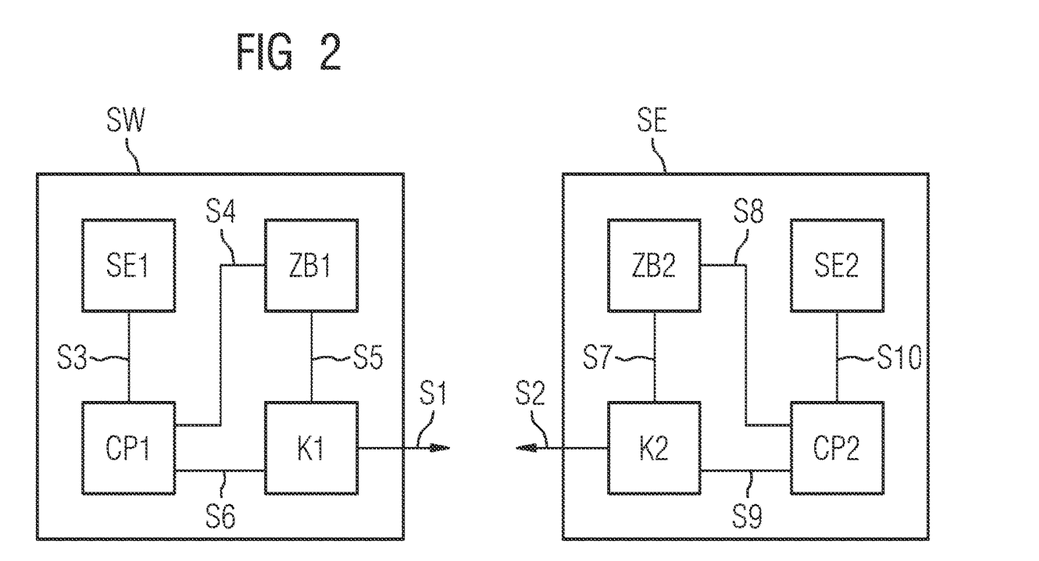
FIG. 2 shows an exemplary embodiment of a computer infrastructure of the communications facilities in the system of FIG. 1 with one computer each, as a block diagram comprising functional units, wherein program modules are processed which can run in one or more processor (s) respectively and wherein the interfaces can accordingly be embodied in terms of software or hardware.

The interlocking SW and the trackside facility SE are schematically represented with their functional components as a block diagram in FIG. 2. The interlocking SW has a first computer CP1 which is connected to a first storage facility SE1 via a third interface S3. In addition, a first time basis ZB1 is provided, which is connected to the computer CP1 via a fourth interface S4 and to the first communications facility K1 via a fifth interface S5.

Results of an application running on the interlocking, which are calculated by the first computer CP1, can be transmitted to the first communications facility K1 via a sixth interface S6, moreover.

The first communications facility K1 serves for communication with the second communications facility K2 in the trackside facility SE. This has been described in relation to FIG. 1. The second communications facility K2 is connected to a second time basis ZB2 via a seventh interface S7. Synchronized communication of the first communications facility K1 with the second communications facility K2 is ensured via the first time basis ZB1 and the second time basis ZB2.

Otherwise, the hardware infrastructure of the trackside facility SE is constructed analogously to that of the interlocking SW, at least on the abstract plane represented in FIG. 2. That is to say, the second time basis ZB2 is connected to a second computer CP2 via an eighth interface S8, which computer is in turn connected to the second communications facility K2 via a ninth interface S9. The second computer CP2 also has a connection to a second storage facility SE2 via a tenth interface S10.

Figure 3:
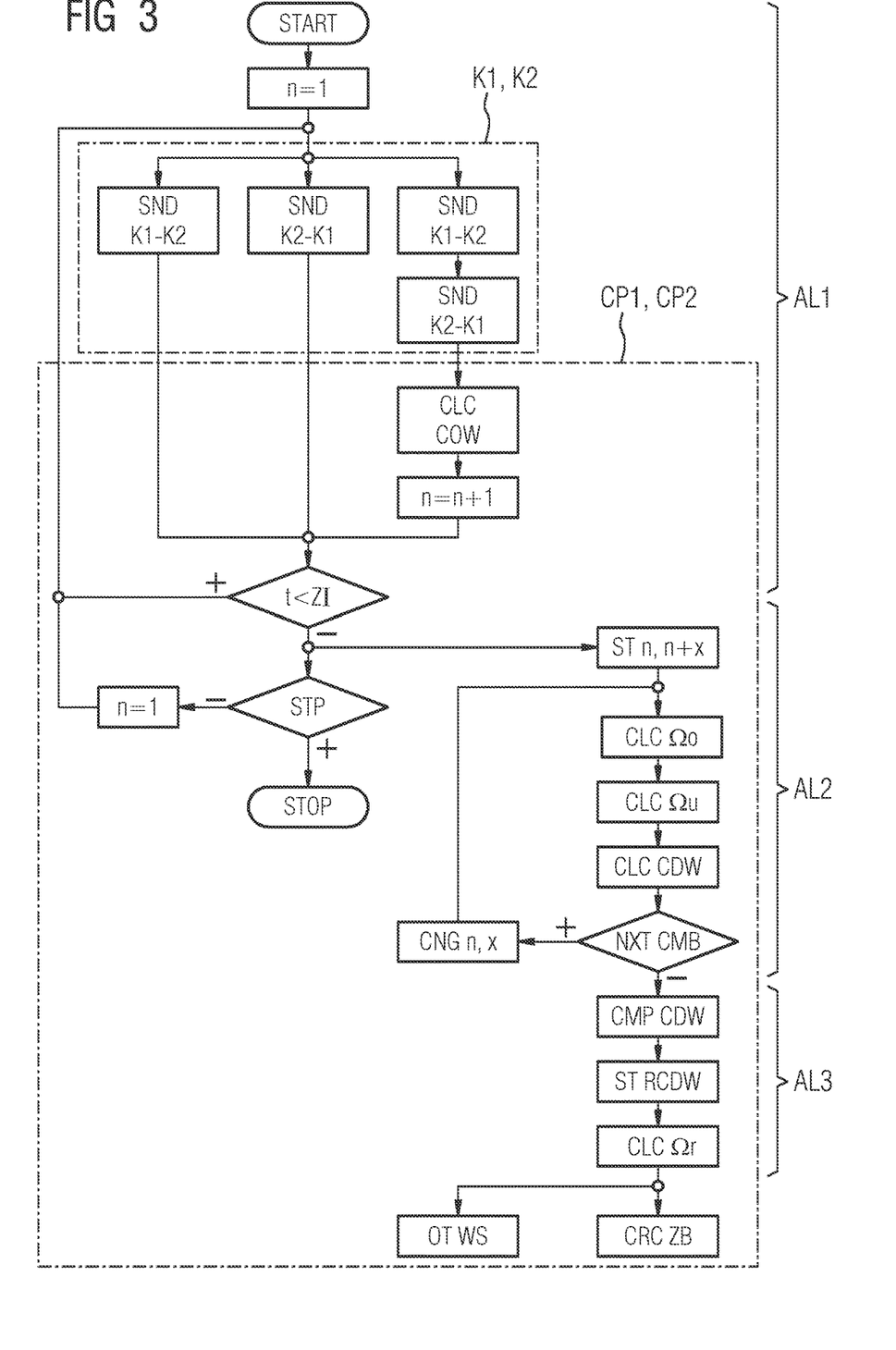
FIG. 3 shows an exemplary embodiment of the inventive method as a flowchart, wherein the individual method steps can be realized individually or in groups by program modules and wherein the functional units and interfaces of FIG. 2 are indicated by way of example, FIG. 4 schematically shows the implementation of Cristian's algorithm with two time bases in the first sequence shifted by a time delay $\delta$.

The inventive method can be comprehended in a flowchart on the basis of FIG. 3. After the method has started, a control variable n=1 is set since the first measuring step n is carried out. n thus stands for the measuring step and is therefore 1 in the first pass.

Depending on the requirements of the proceeding method, further method steps can subsequently be chosen, with FIG. 3 not representing in detail how these requirements are ascertained. The three possible method steps are therefore represented simply in parallel. Subsequently, a sending step SND K1-K2 can be carried out during which a message is sent from the first communications facility K1 to the second communications facility K2. Alternatively, a sending step SND K2-K1 can be carried out if a message is to be sent from the second communications facility K2 to the first communications facility K1. The direction that is necessary during sending depends on the proceeding 8 processes of the corresponding applications. The sending of messages, which relate to the processing of applications, is primarily carried out in relation to the third alternative, which will be described below.

Subsequently, in order to guarantee a first sequence AL1 of the inventive method, firstly a sending step SND K1-K2 is carried out in order to send a message from the first communications facility K1 to the second communications facility K2. The latter reacts in that a message is sent back in a sending step SND K2-K1 from the second communications facility K2 to the first communications facility K1. As will be explained in more detail below, these two sending steps can be used in order to calculate in a calculation step CLC COW a time delay interval COW for the two sending steps, in which interval a possible actual time delay $\Delta(n)$ can lie. The control variable n is then increased by 1 in a step n=n+1.

Regardless of which of the three alternatives were carried out, in a subsequent query step t>ZI it is queried whether the expired time t even smaller than a defined time interval ZI (which is set, for example, to a minute) has not yet been reached. If this is the case, the three above-mentioned alternative procedures are repeated. If the time interval ZI has expired, however, the first sequence AL1 is concluded, with the alternative method for ascertaining a time delay interval COW having been carried out at least three times.

After conclusion of the first sequence AL1, it is queried in a next query step STP whether the method for carrying out the application should be stopped altogether. If this is the case, the method ends with STOP. If this is not the case, the control variable is re-set to 1 in a step n=1, so the first sequence AL1 can begin once again.

As soon as a first sequence AL1 has been concluded, a second sequence AL2 can begin. An elapsed earlier measuring step n and later measuring step n+1 is chosen in a fixing step ST in this sequence. By comparing the time delay intervals COW (more on this below), an upper limit for a maximum possible drift can be calculated in a calculation step CLC $\Omega$o and a lower limit for a minimum possible drift can be calculated in a calculation step CLC $\Omega$u. By taking these two limits into account a drift interval CDW may be calculated in a calculation step CLC CDW, which interval is significant for the further considerations in the third sequence AL3 (more on this too below).

In a query step NXT CMB it is queried whether a further combination of measuring steps should be investigated. In this case, a different earlier measuring step n and/or a different interval x between the earlier measuring step n and the later measuring step n+x is defined in a change step CNG n, x. The method, as explained above, for ascertaining a further drift interval CDW can be carried out once again.

If no further combinations CMB of measuring steps n, n+x are to be investigated, the third sequence AL3 can begin. This consists of a comparison step CMP CDW in which the available drift intervals CDW ascertained in the second sequence AL2 are compared with one another. Inventively, the smallest ascertained upper limit of the drift interval $\Omega$o and the greatest ascertained lower limit $\Omega$u of the ascertained drift intervals CDW is chosen from the second sequence AL2 here, it being possible for these limits to belong to different drift intervals CDW. In a subsequent fixing step ST RCDW, a resulting drift interval RCDW is ascertained from these two ascertained limits, i.e. the ascertained upper limit of the drift $\Omega$o and the ascertained lower limit $\Omega$u, in which interval measuring errors occurring in the measuring steps n are minimized with a view to the available data. Optionally a resulting drift value $\Omega$r can be calculated in a calculation step CLC $\Omega$r from the resulting drift window RCDW, in which value the resulting drift value $\Omega$r is calculated, for example as a mean, from the upper limit of the drift $\Omega$o and the lower limit of the drift $\Omega$u(based on the resulting drift window RCDW).

The ascertained resulting drift interval RCDW or the ascertained resulting drift value $\Omega$r can serve different purposes in the continuing procedure, of which two are alternatively represented in FIG. 3. For example, an output step OT WS for outputting a warning signal WS can be carried out as soon as the ascertained resulting drift value $\Omega r$ overshoots a critical drift value $\Omega c$, which was defined in advance. The warning signal can be, for example, output or automatically processed in order, for example, to stop a running process of utility programs for the (rail-specific) application running on the computers CP before a synchronization of the first communications facility K1 with the second communications facility K2 is no longer possible.

Alternatively it is possible to correct one of the two time bases ZB in a correction step CRC ZB, i.e. to re-synchronize the first time basis ZB1 and the second time basis ZB2. A time basis can be used as a reference and the other time basis can be adapted to the time basis used as a reference (incrementally or by speeding up or slowing down the time basis to be corrected).

Figure 4:
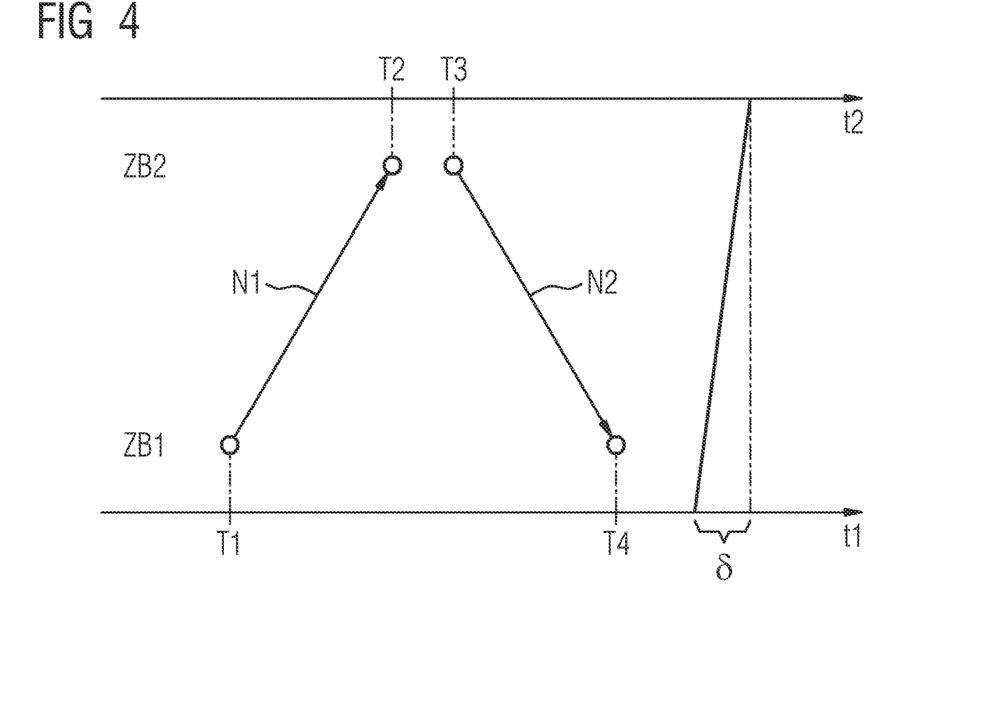

FIG. 4 schematically represents how a first instant T1, a second instant T2, a third instant T3 and a fourth instant T4 are measured for Cristian's algorithm. The instants T1 ... T4 are represented on one first time axis t1 each for the first time basis ZB1 and a second time axis t2 for the second time basis ZB2. This makes it clear that said instants are ascertained with different time bases, between which a real, existing time delay $\delta$, which is drawn between the first time axis t1 and the second time axis t2, can exist. This is not known, however, and is estimated by applying Cristian's algorithm while taking into account the four said instants in the manner already described.

Figure 5:
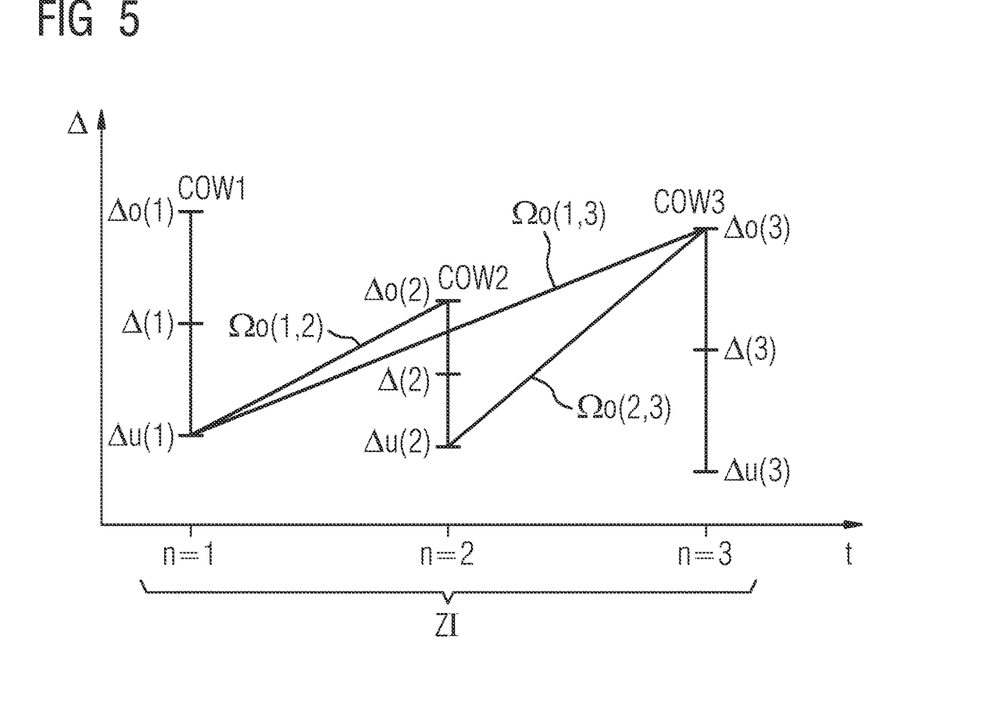
FIGS. 5 and 6 shows the ascertainment of time delay intervals in a representation of the time delay $\Delta$ over time t in the second sequence, wherein upper limits (in FIG. 5) and lower limits (FIG. 6) respectively are ascertained for drift intervals.

FIG. 5 represents the result of a plurality of such estimates n=1 ... 3, with the interval of the individual measurements n in FIG. 5 being represented on a time axis t (x-axis). The calculated time delay $\Delta$ is represented on the y-axis. The measurements n=1 ... 3 all lie within a defined time interval ZI. The time delay intervals COW1 ... COW3 pertaining to the individual measurements n are all calculated, according to FIG. 4, according to Cristian's algorithm. These are intervals within which the actually present time delay $\Delta$ must lie. These have, for example, for the first measurement (n=1), a lower limit $\Delta u(1)$ and an upper limit $\Delta o(1)$ respectively. In addition, a mean $\Delta(1)$ can be ascertained, although this is not significant for the further calculation presented here. This also applies analogously to the second time delay window COW2 and the third time delay window COW3. Further time delay windows COW4 ... can be determined within the time interval ZI (not shown).

Because, within their range, the individual time delay intervals COW1 .... COW3 reliably contain the actual time delay $\Delta$, with knowledge of the time intervals of the individual measurements n and by taking into account a pair von measurements respectively, an upper limit $\Omega o(n, n+x)$ can be determined, with n representing an earlier measurement and n+x a later measurement with the interval x from the measurement n. FIG. 5 represents, for example, ascertainment of the upper limit $\Omega o(1, 2)$ for n=1 and x=1, with it being clear that when considering the two associated time delay intervals COW1, COW2, the drift can at most be so large that it can develop from the lower limit $\Delta u(1)$ of the first time delay interval COW1 to the upper limit $\Delta o(2)$ of the second time delay interval COW2. In other words, the gradient of a straight line $\Delta o(1, 2)$ through two said points, with knowledge of the time interval of measurements 1 and 2, is precisely the maximum possible drift when these two time delay windows are considered.

It can be seen from FIG. 5 that this method can also be carried out for n=1 and x=2 as well as n=2 and x=1. The time intervals of the individual measurements n can be ascertained, for example, by forming the difference between the respective instants t4 (cf. FIG. 1).

Figure 6:
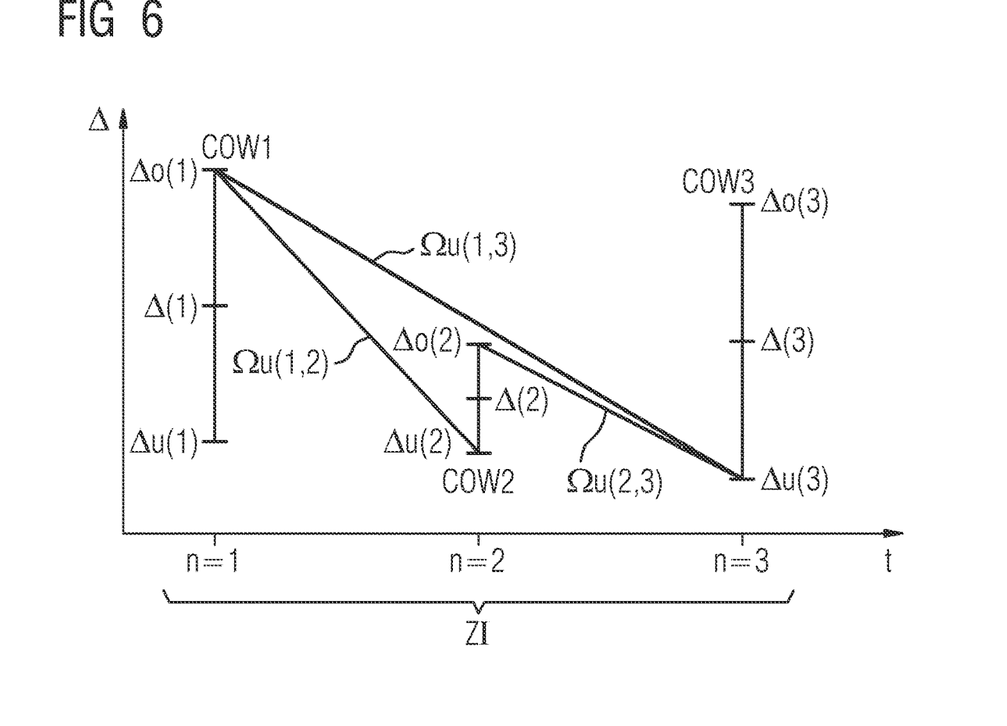

FIG. 6 represents how, analogously, lower limits $\Delta u(n, n+x)$ can also be calculated for the drift. FIG. 6 represents the same time delay intervals COW1, COW2 and COW 3 as in FIG. 5. Ascertainment of the lower limits for the drift $\Omega u$ shall be explained by enlisting the first time delay interval COW1 and the second time delay interval COW2. Unlike in the case of FIG. 5, the upper limit $\Delta o(1)$ of the first time delay interval COW1 and the lower limit $\Delta u(2)$ of the second time delay interval COW2 are now used for ascertaining the lower limit $\Omega u(1, 2)$. A straight line $\Omega u(1, 2)$ again results by connecting these two points. The lower limit $\Omega u(1, 3)$ and the lower limit $\Omega u(2, 3)$ can be calculated analogously in this case too.

Figure 7:
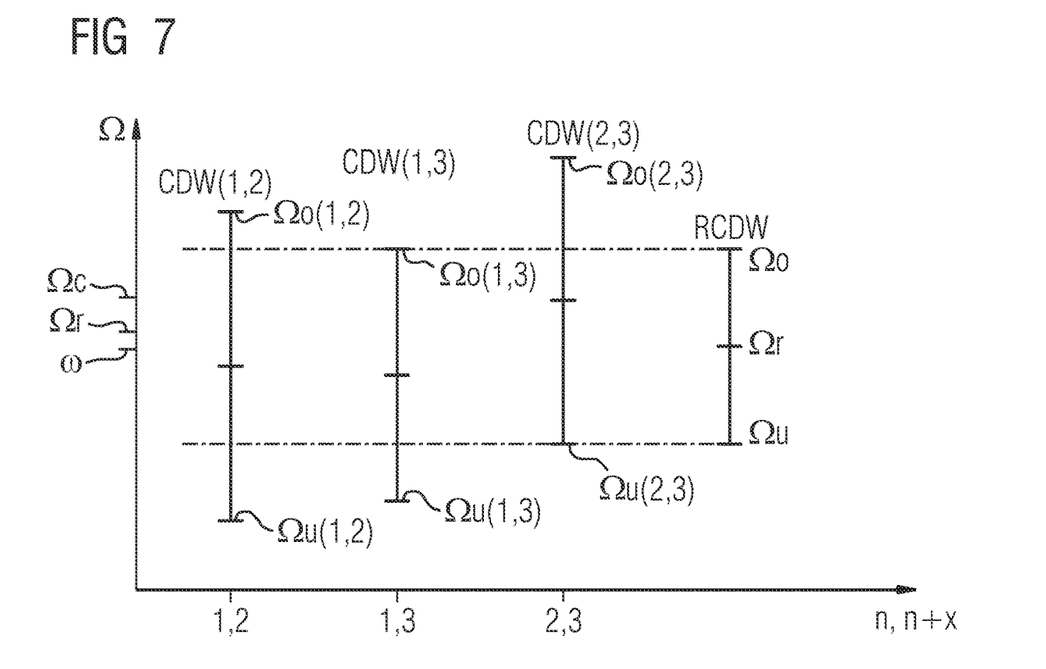
FIG. 7 shows the ascertainment of a resulting drift interval from individual drift intervals in a representation of the drift $\Omega$ by way of respective pairs of measurements n, n+x in a third sequence.

FIG. 7 represents how drift intervals CDW were ascertained for each of the combinations of considered measurements, for the measurements 1 and 2 the drift interval CDW (1, 2), i.e. for the measurements 1 and 3, the drift interval CDW (1, 3) and for the measurements 2 and 3, the drift interval CDW (2, 3). These represent the interval respectively within which a true drift @ reliably lies. It should be noted that the actual drift $\omega$ is still unknown.

The resulting drift interval RCDW can be localized further by the existence of a plurality of drift intervals CDW, however. For this, the smallest upper limit $\Omega o$ of the drift intervals CDW (in FIG. 7, $\Omega o(1, 3)$) and the greatest lower limit $\Omega u$ of the drift intervals (in FIG. 7, $\Omega u(2, 3)$) is defined as the upper limit $\Omega o$ and as the lower limit $\Omega u$ respectively of the resulting drift interval RCDW. It could also be said that the resulting drift interval RCDW is the intersection of the evaluated individual drift intervals CDW. This interval is localized hereby and a resulting drift $\Omega r$ may be calculated, for example by forming the mean from the upper limit $\Omega o$ and the lower limit $\Omega u$ of the resulting drift interval RCDW. This calculation is based on a statistical evaluation, however, and can, as represented in FIG. 7, differ from the actual drift @.

FIG. 7 also represents how a critical value $\Omega c$ can be defined for the drift in order to be able to assess whether it can be accepted for reliable process control, for example, in the calculation of applications by utility programs.

LIST OF REFERENCE CHARACTERS

GL rail
SW interlocking
SE trackside facility
CLD Cloud
ZI time interval
ZB1, ZB2 time basis
SE1, SE2 storage facility
CP1, CP2 computer
S1 ... S10 interface
K1, K2 communications facility
ZB1, ZB2 time basis
T1 ... T4 instant
N1, N2 message
n measuring steps
x interval between measuring steps
t time
$\Delta$ time delay
COW time delay interval
$\Delta o$ upper limit of the time delay interval
$\Delta u$ lower limit of the time delay interval
$\Delta$ actually has time delay
$\Omega$ drift CDW drift interval
RCDW resulting drift interval
Ωo upper limit of the drift interval
Ωo lower limit of the drift interval
Ωr resulting value
Ωc critical value
ω actual drift
AL1 . . . AL3 sequence
SND sending step
CLC calculation step
STP query step end of method
ST fixing step
CMP comparison step
CNG change step
OT output step
CRC ZB correction step for time basis
NXT CMB query step after further combinations

The invention claimed is:

1. A method for computer-assisted monitoring of a first time basis of a first communications facility and a second time basis of a second communications facility, the method comprising:
   in a first sequence, carrying out at least three measuring steps, with each measuring step including:
      at a first instant, which is based on the first time basis, sending a first message from the first communications facility to the second communications facility;
      at a second instant, which is based on the second time basis, receiving the first message by the second communications facility;
      at a third instant, which is based on the second time basis, sending a second message from the second communications facility to the first communications facility; and
      at a fourth instant, which is based on the first time basis, receiving the second message by the first communications facility; and
      determining from the first instant, the second instant, the third instant, and the fourth instant a time delay interval in which a time delay can lie between the first time basis and the second time basis;
   in a second sequence, for an earlier measuring step and a later measuring step, and multiple times:
      ascertaining a maximum possible drift in a time between the earlier measuring step and the later measuring step by taking into account a lower limit of the time delay interval for the earlier measuring step and an upper limit of the time delay interval for the later measuring step;
      ascertaining a minimum possible drift in the time between the earlier measuring step and the later measuring step by taking into account an upper limit of the time delay interval for the earlier measuring step and a lower limit of the time delay interval for the later measuring step; and
      while taking into account a maximum possible drift, calculating an upper limit and, while taking into account a minimum possible drift, calculating a lower limit of a drift interval, within which a relative drift describing a change over time in the time delay can lie; and
   in a third sequence, for a plurality of drift intervals:
      setting a lowest upper limit as the upper limit of a resulting drift interval for the relative drift; and
      setting a highest lower limit as the lower limit of the resulting drift interval for the relative drift.

2. The method according to claim 1, which comprises calculating the time delay during a measuring step based on:
   a transmission time of the first message being a time difference between the first instant and the second instant and
   a transmission time of the second message being a time difference between the third instant and the fourth instant.

3. The method according to claim 1, which comprises calculating a maximum possible error for the time delay during a measuring step by taking into account:
   a message runtime measured in the first communications facility as a time difference between the first instant and the fourth instant; and
   a reaction time measured in the second communications facility as the time difference between the second instant and the third instant.

4. The method according to claim 1, which comprises:
   calculating the lower limit of the time delay interval $\Delta u(n)$ of a measuring step n according to the formula:

$$\Delta u(n) = T3(n) - T4(n); \text{ and}$$

calculating the upper limit of the time delay interval $40(n)$ of the measuring step n according to the formula:

$$\Delta o(n) = T2(n) - T1(n);$$

wherein T1 is the first instant, T2 is the second instant, T3 is the third instant, and T4 is the fourth instant.

5. The method according to claim 1, which comprises calculating a time difference between the earlier measuring step and the later measuring step, and thereby taking into account the measured first instants or the measured second instants or the measured third instants or the measured fourth instants of the earlier measuring step and of the later measuring step respectively.

6. The method according to claim 5, which comprises:
   calculating the upper limit $\Omega o(n, n+x)$ of the drift interval according to the formula:

$$\Omega o(n,n+x) = (\Delta o(n+x) - \Delta u(n))/(T4(n+x) - T4(n))$$

calculating the lower limit $\Omega u(n, n+x)$ of the drift interval according to the formula:

$$\Omega u(n,n+x) = (\Delta u(n+x) - \Delta o(n))/(T4(n+x) - T4(n))$$

wherein
   n is the earlier measuring step;
   n+1 is the later measuring step;
   $\Delta u(n)$ is the lower limit of the time delay interval of the earlier measuring step;
   $\Delta u(n+x)$ is the lower limit of the time delay interval of the later measuring step;
   $\Delta o(n)$ is the upper limit of the time delay interval of the earlier measuring step;
   $\Delta o(n+x)$ is the upper limit of the time delay interval of the later measuring step;
   $T4(n)$ is the fourth instant of the earlier measuring step; and,
   $T4(n+x)$ is the fourth instant of the later measuring step.

7. The method according to claim 1, which comprises determining a resulting drift value as a mean of the upper limit of the resulting drift interval and the lower limit of the resulting drift interval.

8. The method according to claim 1, which comprises defining a critical drift value and checking whether the critical drift value lies in the resulting drift interval or the resulting drift value overshoots the critical drift value.

9. The method according to claim 8, which comprises, for the second sequence, defining a time interval within which all earlier measuring steps and later measuring steps to be considered have to lie.

10. The method according to claim 9, which comprises:
defining the time basis of the first communications facility and the second communications facility with reference to one of the communications facilities; and
modifying the time basis of another of the communications facilities by taking into account the resulting drift.

11. A system, comprising:
a first communications facility having a first time basis;
a second communications facility having a second time basis; and
an interface for establishing a communications link between said first communications facility and said second communications facility;
wherein the communications system is configured to carry out the method for computer-assisted monitoring according to claim 1.

12. The system according to claim 11, wherein said interface for establishing the communications link is provided by a Cloud.

13. The system according to claim 11, wherein the system is a rail system.

14. A non-transitory computer program product, comprising computer-executable program commands for carrying out the method according to claim 1.

15. A non-transitory computer-readable storage medium storing a computer program product with commands which, when executed on a computing unit, cause the computing unit to carry out the method according to claim 1.

* * * * *

UNITED STATES PATENT AND TRADEMARK OFFICE
CERTIFICATE OF CORRECTION

PATENT NO. : 12,114,276 B2
APPLICATION NO. : 18/571352
DATED : October 8, 2024
INVENTOR(S) : Daniel Fortunati et al.

Page 1 of 1

It is certified that error appears in the above-identified patent and that said Letters Patent is hereby corrected as shown below:

In the Claims

Claim 4, Column 16, Lines 23-24 should read as follows:
calculating the upper limit of the time delay interval $\Delta o(n)$
of a measuring step n according to the formula Claim 6, Column 16, Line 44 should read as follows:
$\Omega u(n, n+x) = (\Delta u(n+x) - \Delta o(n)) / (T4(n+x) - T4(n))$ Signed and Sealed this
Twenty-sixth Day of November, 2024

Katherine Kelly Vidal
*Director of the United States Patent and Trademark Office*